United States Patent [19]

Ganter

[11] Patent Number: 5,586,852
[45] Date of Patent: Dec. 24, 1996

[54] SPRING-LOADED PRESS PIN

[75] Inventor: Bernhard Ganter, Furtwangen, Germany

[73] Assignee: Otto Ganter & Co. KG, Furtwangen, Germany

[21] Appl. No.: 352,061

[22] Filed: Nov. 30, 1994

[30] Foreign Application Priority Data

Dec. 28, 1993 [DE] Germany ............................. 9319799 U
Dec. 28, 1993 [DE] Germany ............................. 9319800 U

[51] Int. Cl.⁶ ........................................................ F16B 21/18
[52] U.S. Cl. ............................................. 411/353; 411/349
[58] Field of Search ................................ 411/347, 349, 411/343, 353, 552, 549

[56] References Cited

U.S. PATENT DOCUMENTS

| | | | |
|---|---|---|---|
| 1,372,242 | 3/1921 | Mepsted | 411/347 |
| 2,216,385 | 10/1940 | Chobert | 411/352 |
| 2,442,064 | 5/1948 | Veit | 411/349 |
| 2,967,557 | 1/1961 | Tait | 411/349 |
| 3,125,922 | 3/1964 | Sauter | 411/349 |
| 3,912,411 | 10/1975 | Moffat | 411/352 |
| 4,047,266 | 9/1977 | Bisbing | 411/349 |
| 5,073,075 | 12/1991 | Duran | 411/349 |

Primary Examiner—Steven N. Meyers
Assistant Examiner—Gary Estremsky
Attorney, Agent, or Firm—Jacobson, Price, Holman & Stern, PLLC

[57] ABSTRACT

There is described a spring-loaded press pin comprising a pin which passes through a guide sleeve and in the process is slidable against a resilient force, and a stud mounted at the upper end of the pin. Radially between the guide sleeve and the stud is provided an axially extending recess which receives a compression spring. In one embodiment, the stud can be latched by raising and turning it in the raised position.

8 Claims, 4 Drawing Sheets

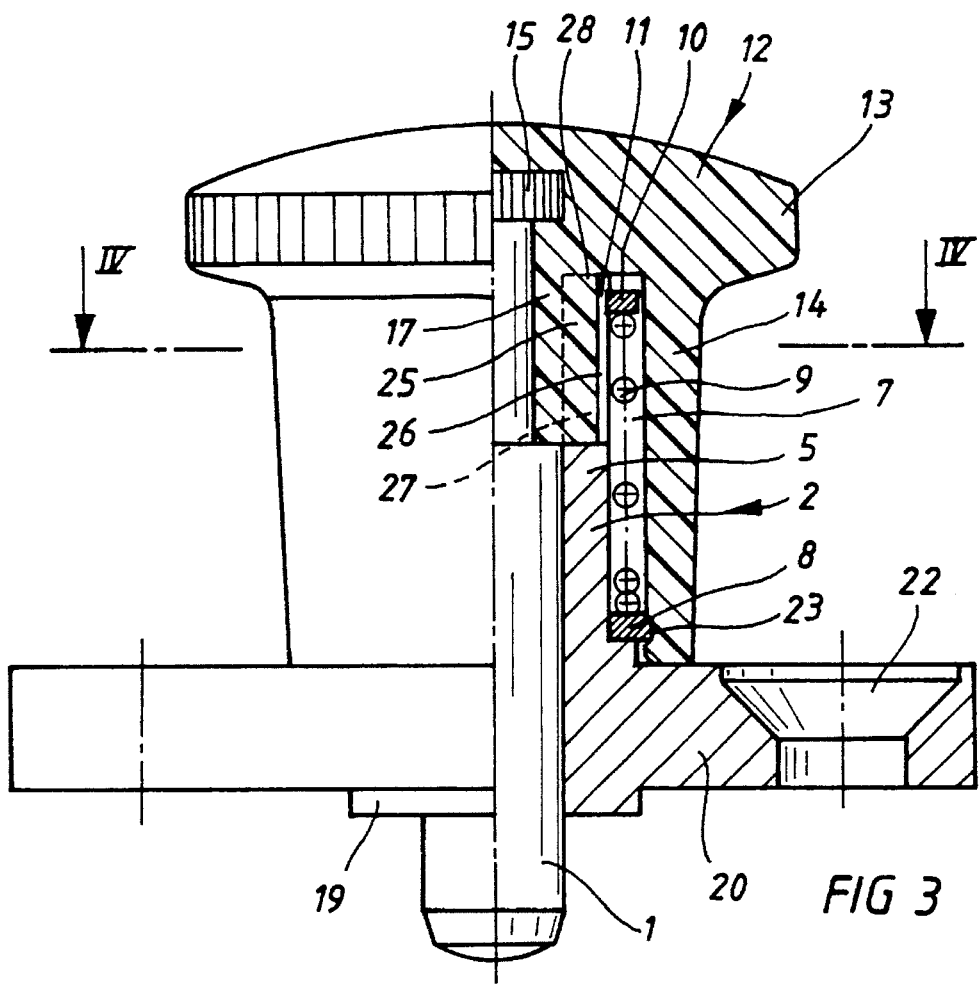
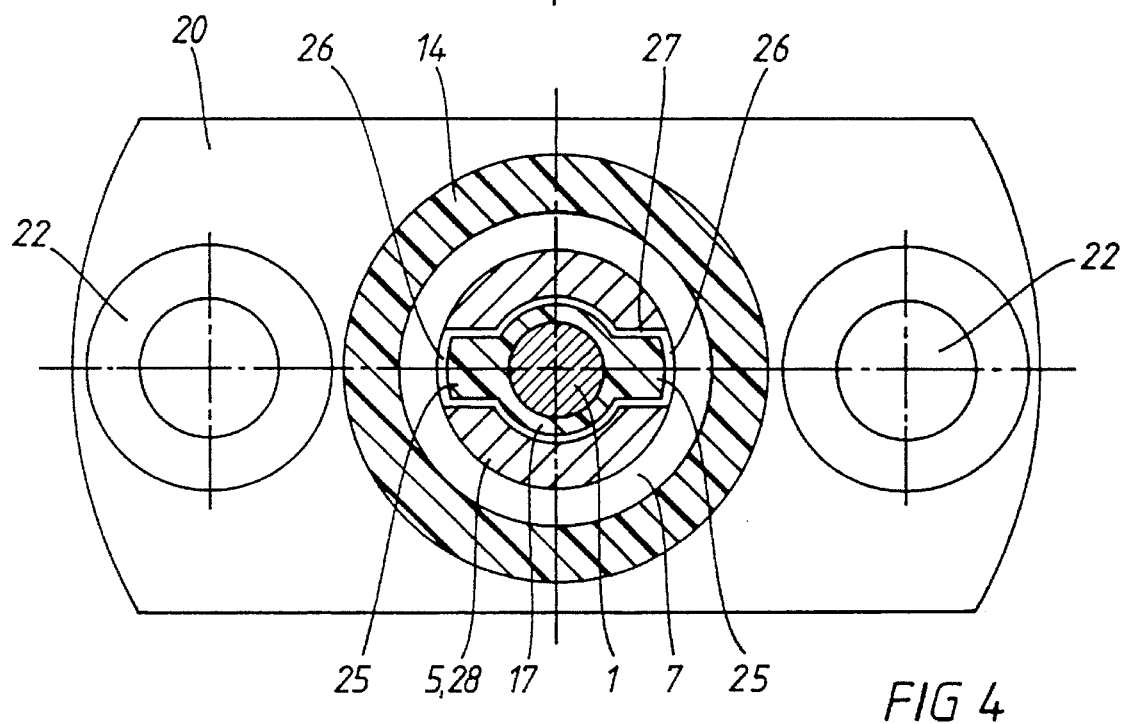

SPRING-LOADED PRESS PIN

BACKGROUND OF THE INVENTION

This invention relates to a spring-loaded press pin of the type which comprises a pin slidable within a guide sleeve against a resilient force.

A pull pin of this kind has become known in various constructions. It is common to these constructions that a stud is attached to the pin which as a rule is made of metal. The pin in this case passes through a guide sleeve in which it is slidable against a resilient force. A compression spring for exerting the resilient force is supported at one end on a fixed shoulder of the pin and at the other end on a shoulder which is formed in the guide sleeve. The guide sleeve and the stud are therefore located axially one above the other, which is associated with the disadvantage of a large overall height.

SUMMARY OF THE INVENTION

An object of the invention is to provide a spring-loaded pin of the kind mentioned hereinbefore in which a substantially smaller overall height can be achieved.

In order to achieve this object, radially between the guide sleeve and the stud is formed a recess extending essentially in an axial direction, in which the compression spring is arranged.

An essential characteristic of the invention is therefore that the recess for mounting the spring which operates in the axial direction is now formed between the guide sleeve and the stud, so that the two parts engage in each other, which was not the case with the known constructions. In the prior art constructions, these parts were arranged axially one above the other with respect to the pin which passed through both parts. In the present invention, there is the advantage that a substantially smaller overall height is achieved because these parts engage in each other and in the overlap region is arranged the spring which is necessary for spring preloading of the pin.

Compared with a pin according to the prior art which has an overall height of e.g. 67 mm, according to the invention an overall height of the same pin of 50 to 55 mm is achieved. The decrease in overall height of a press pin of this kind accordingly offers substantial advantages.

As described hereinabove, the two parts, that is, the guide sleeve and the stud, engage in each other and in the overlap region is the recess receiving the spring and extending in the axial direction. In this case according to an embodiment of the invention it is provided that the guide sleeve comprises a sleeve portion which has a relatively small diameter which is at least partially overlapped at its outer circumference by a sleeve portion of larger diameter which is a part of the stud.

The last-mentioned sleeve portion of larger diameter which is part of the stud can in this case either be connected in one piece with the material of the stud itself, or it may be provided that this sleeve portion is manufactured e.g. from a metal sleeve which is then connected by suitable connecting means to the lower side of the stud.

It is important that the two sleeve portions engage in each other and form between them the annular peripheral recess for receiving the compression spring.

There are several alternative means of mounting the spring in the recess. In a first embodiment, the spring is held on the guide sleeve by means of a spring ring, while in a second embodiment the spring is held in the recess by the fact that it is retained therein by a cap installed in the stud.

In another embodiment of the present invention it is provided that the pin comprises a device for locking the stud in a raised state. This locking is achieved by the fact that on the lower side of the stud are arranged one or more ribs which cooperate with corresponding latching recesses of the guide sleeve. In the lowered state of the stud, the ribs engage in the latching recesses, so that turning of the stud relative to the guide sleeve is prevented.

After raising of the stud, as a result of which the ribs no longer engage in the latching recesses, the stud can be turned relative to the guide sleeve. This leads to the ribs being seated with their lower side on the upper plane surface of the side flanks of the latching recesses. Hence the stud is held its upper position.

For relatching of the stud, the latter is turned again until the ribs engage in the latching recesses in alignment and then lowered.

Embodiments of the present invention will be described by way of example with reference to the accompanying drawings, from which further characteristics and advantages of the invention will become apparent.

BRIEF DESCRIPTION OF THE DRAWINGS

FIG. 3 is a section through a press pin according to a third embodiment of the invention;

FIG. 4 is a section along the line IV—IV in FIG. 3;

DETAILED DESCRIPTION OF THE EMBODIMENTS OF THE INVENTION

Figure 1:
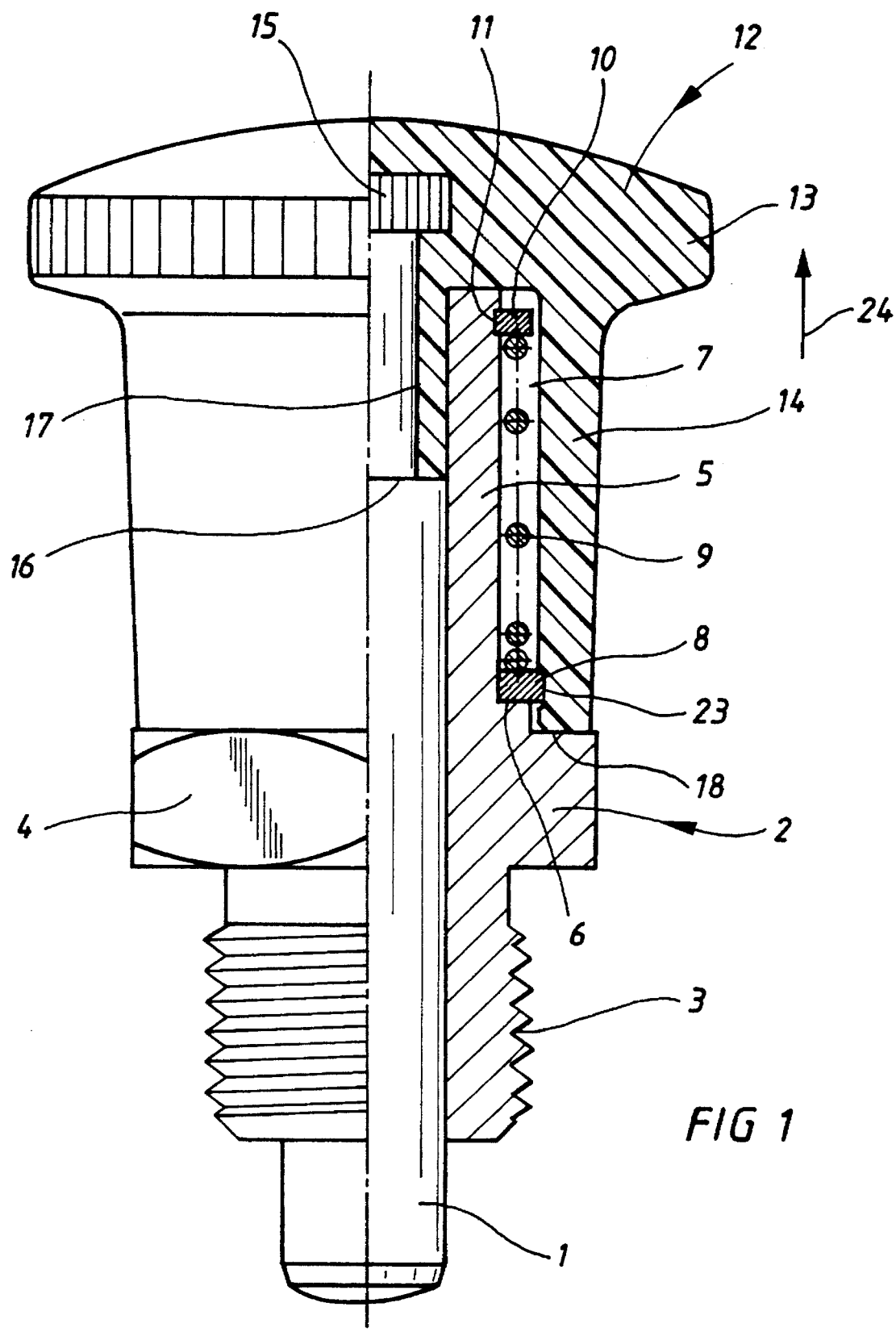
FIG. 1 is a section through a press pin according to a first embodiment of the invention.

For the purpose of clarity, the same components of the described embodiments are identified by the same reference numerals.

Figure 2:
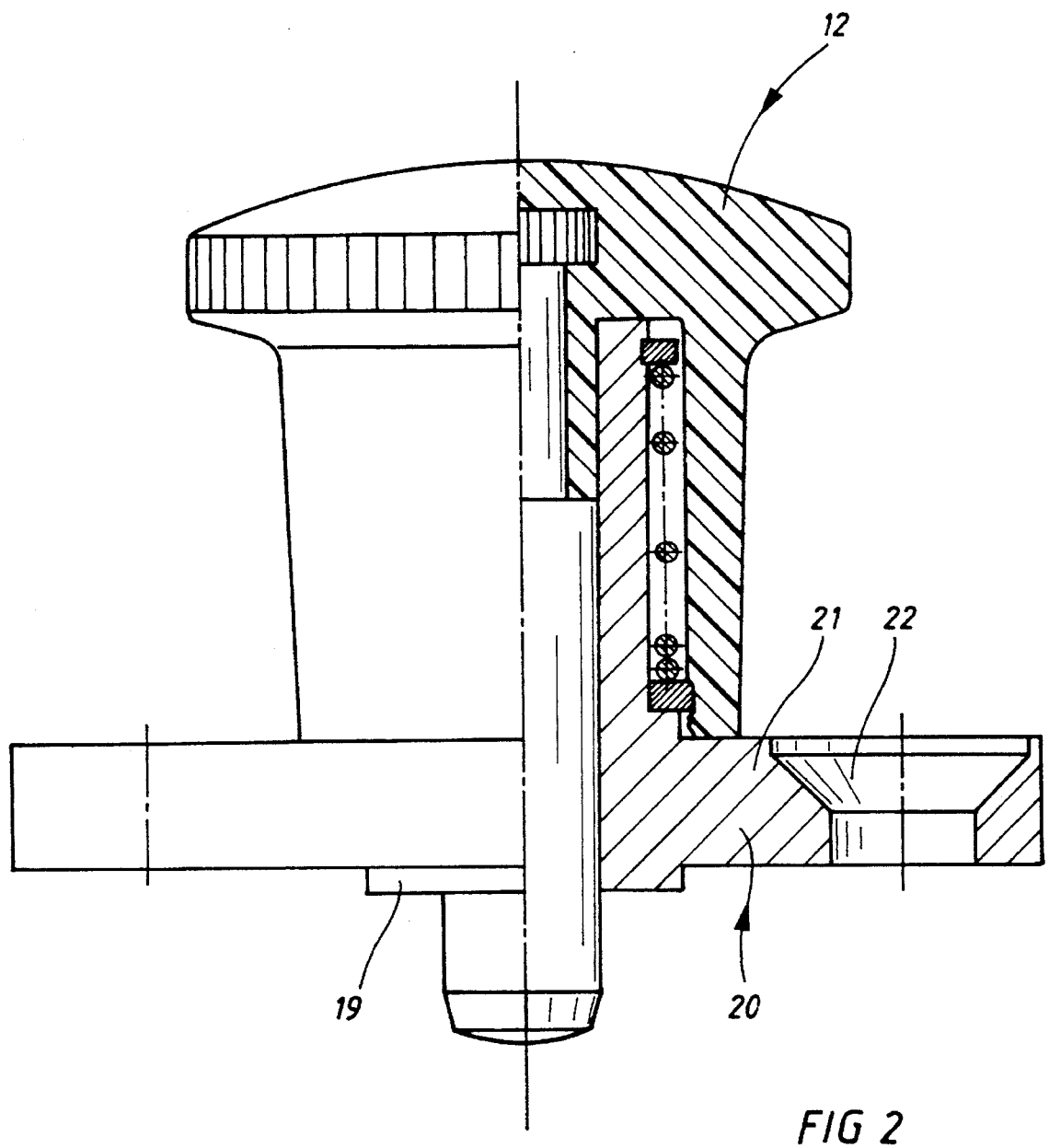
FIG. 2 is a section through a press pin according to a second embodiment of the invention.

According to FIGS. 1 and 2, the press pin 1 essentially consists of a pin which as a rule is constructed as a metal bolt. The pin passes through a guide sleeve 2, so that the pin is movable in an axial direction in the guide sleeve 2. The guide sleeve 2 essentially consists of a lower thread 3 which is formed adjacent an upper spanner surface 4 of larger diameter. The spanner surface 4 serves for engagement of a tool with this surface in order to screw the whole press pin into the thread of a receiving bore (not shown).

The guide sleeve 2 comprises at its upper end a sleeve portion 5 of reduced diameter which abuts against the outer circumference of the pin 1 essentially over its whole length.

FIG. 1 shows however that in the upper region the stud 12 comprises an inner sleeve portion 17 which abuts against the upper portion of the pin 1 in order thus to offer a better contact surface and mounting surface for the pin 1. Moreover the pin 1 is provided at the top with a milled edge 15 which is cast integrally in the plastic material of the stud 12.

It is not essential that the stud is made of plastic; a metal stud which is connected to the pin 1 in force-locking relationship by riveting, screwing, adhesion or the like can also be used.

Similarly the sleeve portion 17 can be omitted, whereupon the stud 12 is then defined only by its upper gripping portion 13.

It is important that on the outer side of the stud 12 there is formed a sleeve portion 14 of larger diameter than that of the sleeve portion 5 of the guide sleeve 2, and the diameter of the inner circumference of the sleeve portion 14 is larger than the diameter of the outer circumference of the sleeve portion 5, so that between the two sleeve portions 5, 14 is formed a recess 7 extending essentially in the axial direction.

In the region of this recess 7 is arranged a compression spring 9 which provides the resilient loading of the press pin. The spring 9 is supported on a washer 8 in the region of the recess 7, which washer rests on a shoulder 6 of the guide sleeve 2.

On the opposite side of the recess 7 is provided a spring ring 10 which is snap fitted in an associated groove 11 at the outer circumference of the sleeve portion 5 of the guide sleeve 2. The washer 8 is latched to the sleeve portion 14 of the stud 12 by means of an undercut portion 23.

Instead of the undercut portion 23, the washer 8 could be screwed into the sleeve portion 5, pressed in, glued in or otherwise connected in a force-locking relationship.

Moreover the sleeve portion 17 of the stud 12 is supported on a shoulder 16 of the pin, which for manufacturing reasons is advantageous if the pin is cast integrally with the stud 12.

Operation of the press pin takes place in such a way that by means of hand movement the gripping portion 13 is gripped and the stud 12 is pulled upwardly in the direction of arrow 24 against the force of the spring 9. Upon movement of the stud 12 in the arrow direction 24 the washer 8 is lifted off the shoulder 6 whilst the spring ring 10 remains in place, as a result of which the spring 9 is compressed and a corresponding resilient force is applied to the washer 8 and hence to the stud 12 in a direction opposite to the arrow direction 24.

The washer 8 moreover acts as a guiding aid or as centering means when the stud 12 moves in the arrow direction 24 and in the opposite direction, because it slides along with its inner circumference over the outer circumference of the sleeve portion 5 of the guide sleeve 2. Hence inadmissible tilting of the stud 12 upon operation is avoided.

Instead of the manual operation of the stud 12 described above, the stud can for example be operated without manual operation by a pull cable, a lever or the like. Moreover it is not necessary for the sleeve portion 14 to be formed in one piece with the material of the stud 12. It is also possible to make the sleeve portion 14 as a separate sleeve from a different material, in order to connect it subsequently to the stud 12.

It is important that substantial overall height is saved because the guide sleeve 2 and the stud 12 engage in each other in overlapping relationship and in the overlap region is the above-mentioned spring 9.

In the embodiment of FIG. 2 the only difference from that of FIG. 1 is that there is a guide sleeve 20 which comprises a screw-on flange 21 having bores 22 distributed over the circumference, so that the whole press pin can be mounted on a mounting surface by means of screws (not shown) which pass through the bores 22. In this embodiment a centering attachment 19 on the lower side of the guide sleeve 20 engages in an associated centering recess in the region of the mounting surface.

In the embodiment of FIGS. 3 and 4 there is a provided a latching mechanism for the stud 12. This latching mechanism is arranged radially inwardly of the recess 7. The guide sleeve 2 comprises in this embodiment two latching recesses 27 at its end facing towards the stud 12. Formed integrally with stud 12 is an inner guide sleeve 17 which comprises wing-like ribs 25 extending radially outwardly. Instead of the two ribs 25 and latching recesses 27 shown here, naturally the use of one or more of these components is possible.

In the unraised position of the stud 12 the ribs 25 engage in the latching recesses 27, wherein in FIG. 3 can be seen only the slot 26 of the latching recess 27, which extends over the circumference.

If the stud 12 is raised e.g. by gripping the gripping portion 13, then at first there is sliding of the stud 12 relative to the stationary guide sleeve 2, wherein the ribs 25 slide upwardly along the side flanks of the latching recesses 27. As soon as the ribs 25 become disengaged from the latching recesses 27, the stud 12 can be turned in the circumferential direction, so that the ribs 25 are supported with their lower sides on the plane side 28 of the guide sleeve. Hence the stud 12 is locked in its raised position, as a result of which the pin 1 no longer protrudes beyond the lower side of the guide sleeve 2.

Figure 5:
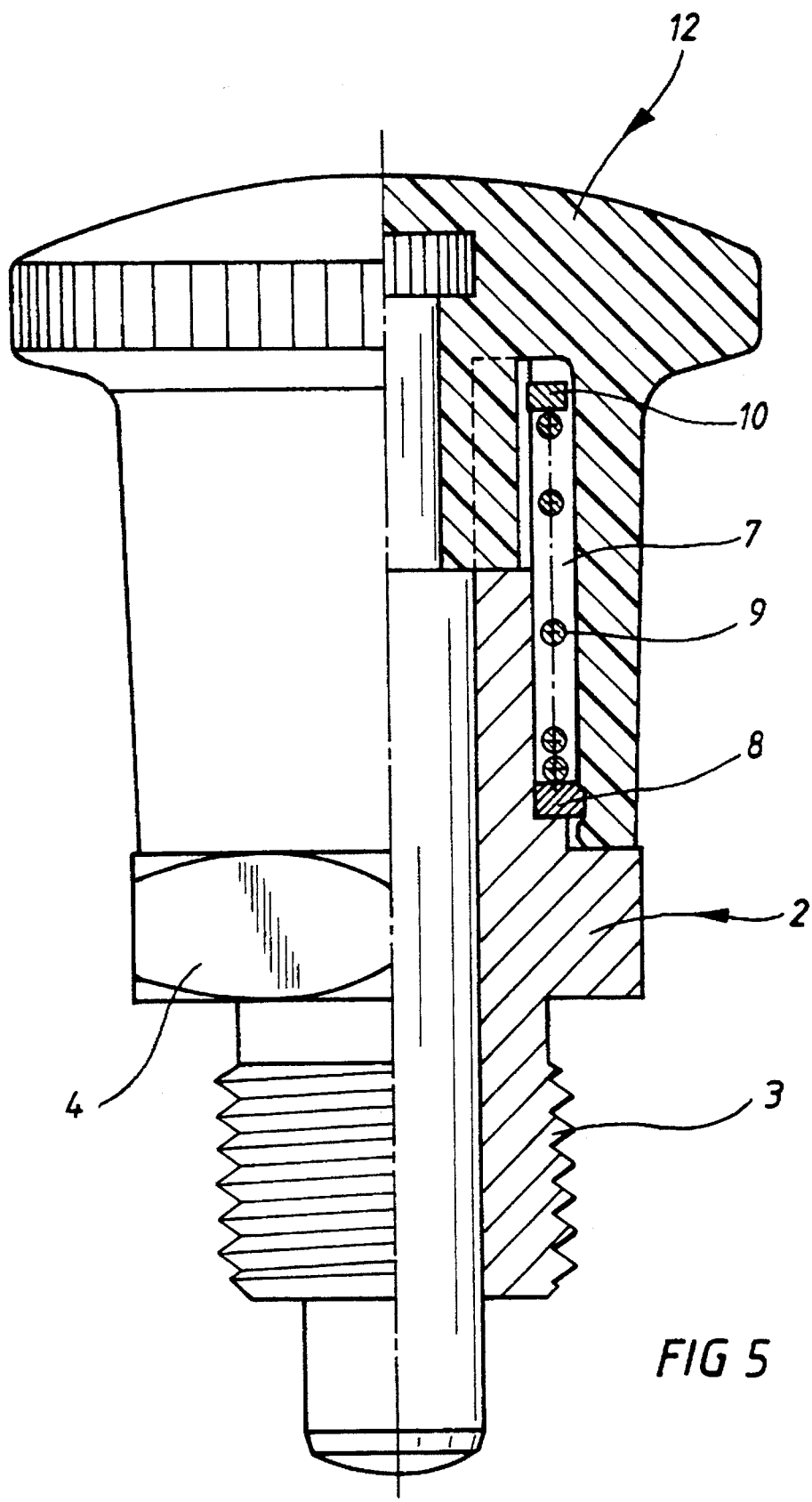
FIG. 5 is a section through a press pin according to a fourth embodiment of the invention.

According to the embodiment of FIG. 5 it is of course also possible to provide, instead of the screw-on flange 20, a thread 3 for connection of the guide sleeve 2.

With the present invention therefore a small spring-loaded pin which may comprise a latching device is provided for the first time.

What is claimed is:

1. A press pin comprising a longitudinally extending pin, a longitudinally extending guide sleeve longitudinally slidably mounted on said pin, said pin having one end extending axially from one end of said guide sleeve, the other end of said pin having a stud connected thereto, said stud including a longitudinally extending sleeve portion telescopically overlapping a portion of said guide sleeve, said sleeve portion of the stud having an inner diameter larger than the external diameter of said guide sleeve to form an axially extending circumferential recess between the guide sleeve and sleeve portion of the stud, a compression spring oriented in said recess and having ends engaged with said guide sleeve and said sleeve portion of the stud to exert resilient force biasing said guide sleeve axially inwardly in relation to said stud and pin, said guide sleeve including a structure adapted to connect said guide sleeve to a mounting structure to enable the stud and pin to move axially outwardly in relation to the guide sleeve and mounting structure by exerting axial outward force on said stud sufficient to compress said spring.

2. The press pin as defined in claim 1 wherein said spring includes one end engaging a radial inward projection on said sleeve portion of the stud and extending into said recess remote from said end of the pin having the stud connected thereto, said spring having a second end engaging a radial outward projection on said guide sleeve and extending into said recess adjacent said end of the pin having the stud connected thereto.

3. The press pin as defined in claim 2 wherein said radial projections are annular members substantially bridging the radial extent of the recess to substantially prevent tilting of the sleeve portion of the stud in relation to the guide sleeve during relative sliding movement.

4. The press pin as defined in claim 3 wherein said connecting structure on said guide sleeve is a threaded area on said guide sleeve remote from said stud connected to the pin adapted to be threaded into a bore in the mounting structure.

5. The press pin as defined in claim 3 wherein said connecting structure on said guide sleeve is a radially extending plate on said guide sleeve adapted to be fastened to the mounting structure.

6. The press pin as defined in claim 3 wherein said guide sleeve includes a radially outwardly projecting shoulder engaged by said sleeve portion of the stud to limit the expansion of said spring.

7. The press pin as defined in claim 1 wherein the end of said pin having the stud connected thereto includes a radial latch member extending laterally outwardly, said guide sleeve including a longitudinally extending slot therein slidably receiving said latch member, said slot being open adjacent the end of the pin having the stud attached thereto to enable the latch member to exit from the open slot and be rotated a partial turn and rest on the end of the guide sleeve to lock the pin and stud in relation to the guide sleeve thereby retaining said spring in compressed position with the pin retracted axially inwardly in relation to said guide sleeve, said spring returning said pin to an axially extended position when the pin and stud are rotated to align the latch member with the slot to enable the spring to expand and move the latch member into said slot.

8. The press pin as defined in claim 2 wherein the end of said pin having the stud connected thereto includes a radial latch member extending laterally outwardly, said guide sleeve including a longitudinally extending slot therein slidably receiving said latch member, said slot being open adjacent the end of the pin having the stud attached thereto to enable the latch member to exit from the open slot and be rotated a partial turn and rest on the end of the guide sleeve to lock the pin and stud in relation to the guide sleeve thereby retaining said spring in compressed position with the pin retracted axially inwardly in relation to said guide sleeve, said spring returning said pin to an axially extended position when the pin and stud are rotated to align the latch member with the slot to enable the spring to expand and move the latch member into said slot.

* * * * *